Sept. 13, 1932.   R. R. SEARLES   1,877,735
SPRING CONNECTION
Filed April 13, 1929
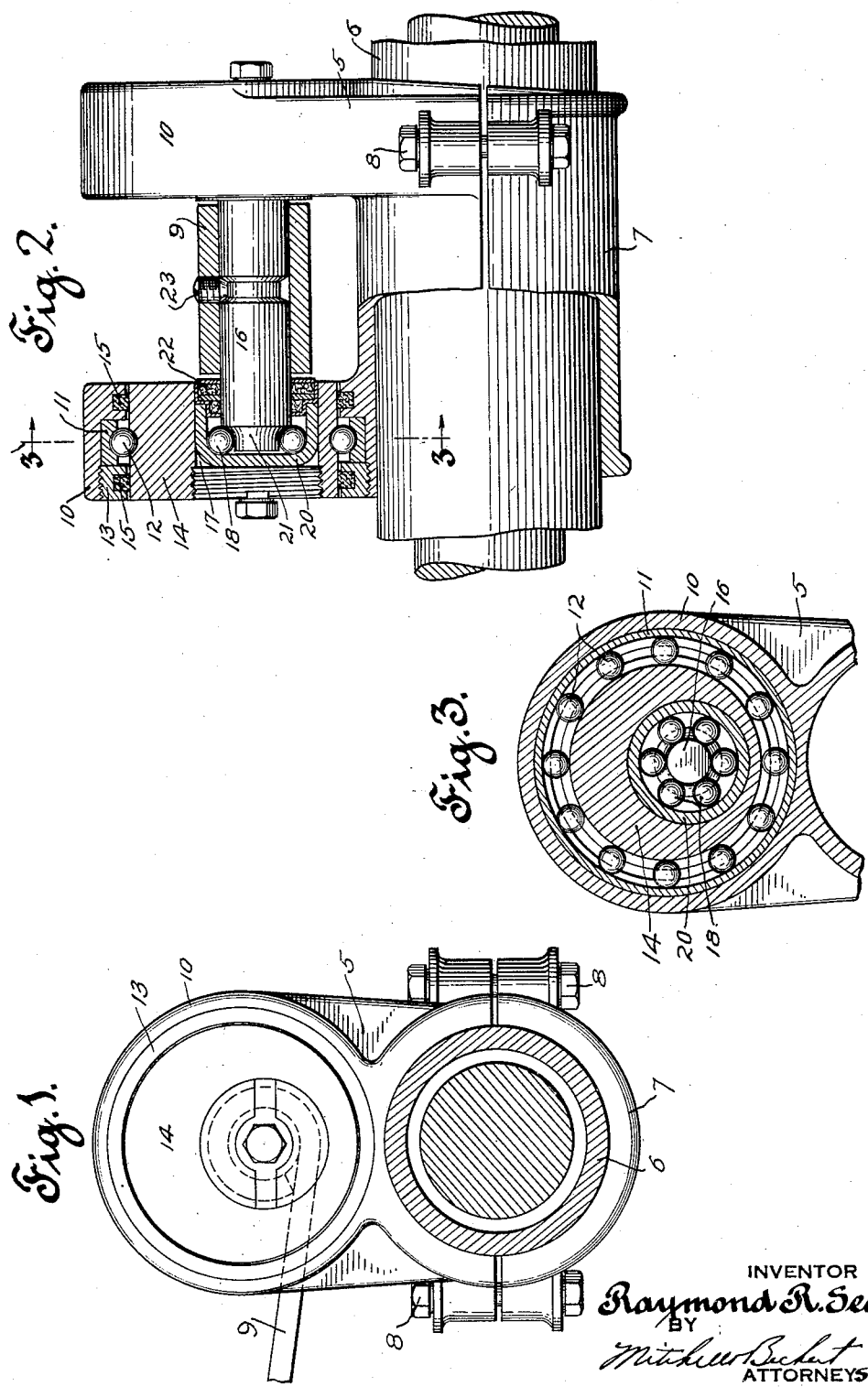
INVENTOR
Raymond R. Searles
BY
Mitchell Bechet
ATTORNEYS Patented Sept. 13, 1932

1,877,735

UNITED STATES PATENT OFFICE

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING CONNECTION

Application filed April 13, 1929. Serial No. 354,722.

My invention relates to an antifriction spring end connection for connecting the frame and spring, or an axle and spring, of a motor vehicle.

It is an object of the invention to provide an improved antifriction spring connection for a motor vehicle which shall be simple and compact in construction, relatively cheap to manufacture, and serviceable in use.

It is another object to provide a compact antifriction spring end connection for a motor vehicle which will provide a positive connection and yet will permit free lengthening and shortening of a spring without the use of shackle links.

It is another object to provide a compact antifriction spring end connection for a vehicle spring in which full circular race rings may be employed so that there may be true rolling motion of the antifriction bearing members and yet lengthening of the spring may be permitted without the use of shackle links.

Other objects and features of invention will become apparent.

Broadly, the invention includes an outer raceway, an inner raceway and an intermediate raceway with antifriction bearing members interposed between the outer and intermediate and between the intermediate and inner raceways to permit true rolling motion of said bearing members. One of the raceways is arranged eccentrically of the other two. One of the raceways, preferably the inner, is connected to the spring of a vehicle while preferably the outer is connected to the frame, axle or axle housing.

In the drawing which shows, for illustration preferably the outer is connected to the invention, I have shown my invention as embodied in a spring end connection for connecting the spring and axle of a motor vehicle, but it is to be understood that this showing is but illustrative and the principles of the invention may as well be employed in connecting the spring to the frame of the vehicle.

In the drawing—

Fig. 1 is a sectional view through an axle and housing and illustrating features of my invention;

Fig. 2 is a fragmentary longitudinal side view of an axle housing and parts for connecting a spring thereto, parts being shown in section for illustration;

Fig. 3 is a sectional view taken substantially on the plane of the line 3—3 of Fig. 2.

In said drawing, 5 indicates a frame which may be a part of the motor vehicle frame or, as shown, connected to the axle or axle housing 6 of a motor vehicle. The frame 5 may be clamped to the axle housing 6 as by means of a cover cap 7 secured by through-bolts 8—8. 9 indicates a spring to be connected to the frame 5 whether the latter be a part of the vehicle frame or a part of or secured to an axle or housing. My improved spring end connection when connected to an axle housing is particularly adapted for cantilever spring constructions.

In the particular form illustrated, the frame 5 includes spaced apart bosses 10—10, each carrying an outer circular race ring 11 for antifriction bearing members such as balls 12. The bosses and parts associated therewith are substantial duplicates of each other and only one will be described in full. The race ring 11 may be a part of, but is preferably separate from and secured to the boss 10 as by means of a nut 13.

A second race ring 14 which I may term an intermediate race ring is mounted within each boss 10 and is supported by the antifriction bearing members 12. Suitable dust seals 15—15 may be provided for excluding dust and dirt from the bearing surfaces and retaining lubricant thereon.

A third race member such as a pin 16 carried by the other member to be connected (in this case the spring 9) is connected to the intermediate ring 14. The intermediate race ring may be provided with an eccentric bore 17 into which the ends of the pin 16 extend. Antifriction bearing members such as balls 18 are interposed between the pin ends and the eccentric bore. As illustrated, I may employ a cup race 20 to accurately fit within the bore 17 and the raceways for the pin ends may be cut directly upon the pin ends as indicated at 21. A suitable dust seal 22 may be employed for excluding dust and dirt from the bearing surfaces and retaining lubricant thereon. The pin 16 is secured to the spring 9 in any suitable manner as by a set-screw 23.

It will be seen that when the spring 9 flexes the pin 16 will be rotated slightly and the balls 18 will then rotate as in an ordinary ball bearing. During the flexure of the spring there is also a lengthening or a shortening thereof. During this lengthening and shortening of the spring the pin 16 is moved transversely and due to the eccentric mounting of this pin in the intermediate race ring 14 the latter rotates on the outer bearing balls 12 and the pin 16 is raised or lowered during this rotation of the intermediate ring 14. The maximum lengthening or shortening permitted is twice the eccentricity of the intermediate ring 14 and the pin 16. The positions of the parts shown in Fig. 3 may be said to be the normal or the rest positions. Should the spring lengthen, the pin 16 would be moved transversely and would also be raised slightly. The nearer the axis of the pin 16 comes to passing through a horizontal plane through the axis of the outer ring 11, the greater will be the force required to move the intermediate ring 14 and thus some variable chucking force is placed upon the lengthening or shortening of the spring.

As a practical matter the raceways are so formed that radial loads are carried by the balls and thrust loads in at least one direction are also carried by the balls. As shown, the balls 12 take radial loads and thrusts in both directions while the balls 18 take radial loads and thrusts in one direction.

In the embodiment shown, the outer ring 11, and intermediate ring 14, together with parts carried thereby, may be removed after the retaining ring 13 is removed. It is to be understood that the raceways for the balls 18 on the intermediate ring 14 could be formed directly on such ring instead of as shown. The screw plug holding the cup race 20 in place could be definitely fixed or the bore 17 could have a closed end instead of being provided with an adjustable closure plug. Many other changes and variations will suggest themselves to those skilled in the art.

While the invention has been described in considerable detail and one embodiment thereof illustrated, it is to be understood that the invention may be otherwise embodied and many changes in matters of detail may be made within the scope of the invention as defined in the appended claims.

I claim:

1. In a spring end connection permitting longitudinal movement of the spring relatively to the part connected thereto by said connection, a frame member having a bearing track thereon, antifriction bearing members on said track, an intermediate member engaging said bearing members for rolling contact therewith, means to be carried by a spring and antifriction bearing members interposed between said means and said intermediate member.

2. In a spring end connection permitting longitudinal movement of the spring relatively to the part connected thereto by said connection, a frame member, an intermediate member, antifriction bearing members interposed between said frame and intermediate members, whereby said intermediate member may rotate on said antifriction bearing members, means to be carried by a spring and eccentrically positioned relatively to said intermediate member, and antifriction bearing members interposed between said intermediate member and said means to be carried by said spring.

3. In a spring end connection permitting longitudinal movement of the spring relatively to the part connected thereto by said connection, a frame member embodying an outer race ring for antifriction bearing members, an inner race ring, antifriction bearing members interposed between said race rings, means to be carried by a spring, and means including antifriction bearing members for mounting said means to be carried by a spring eccentrically on said inner race ring.

4. In a spring end connection permitting longitudinal movement of the spring relatively to the part connected thereto by said connection, a frame having a circular bearing race for antifriction bearing members, a circular race ring, antifriction bearing members interposed between the outside of said circular race ring and said circular bearing race on said frame member, said race ring having an eccentric bore therein, a race member in said bore to be carried by a spring, and antifriction bearing members interposed between said race member and said eccentric bore.

5. In a spring end connection permitting longitudinal movement of the spring relatively to the part connected thereto by said connection, a frame to be carried by an axle housing, said frame having an outer race ring for antifriction bearing members, an intermediate race ring, antifriction bearing members interposed between said race rings, means to be carried by a spring, antifriction bearing members to support said means to be carried by a spring on said intermediate race ring, said last mentioned antifriction bearing members being arranged eccentrically of said intermediate race ring.

6. In a spring end connection permitting longitudinal movement of the spring relatively to the part connected thereto by said connection, a frame having spaced apart bosses each having an outer raceway therein, an intermediate raceway member in each said outer raceway, each said intermediate raceway member having an outer raceway thereon and an internal raceway eccentric to said outer raceway, an inner raceway member in Sept. 13, 1932.  M. WAGNER  1,877,736
CHANGE SPEED GEARING
Filed March 27, 1930
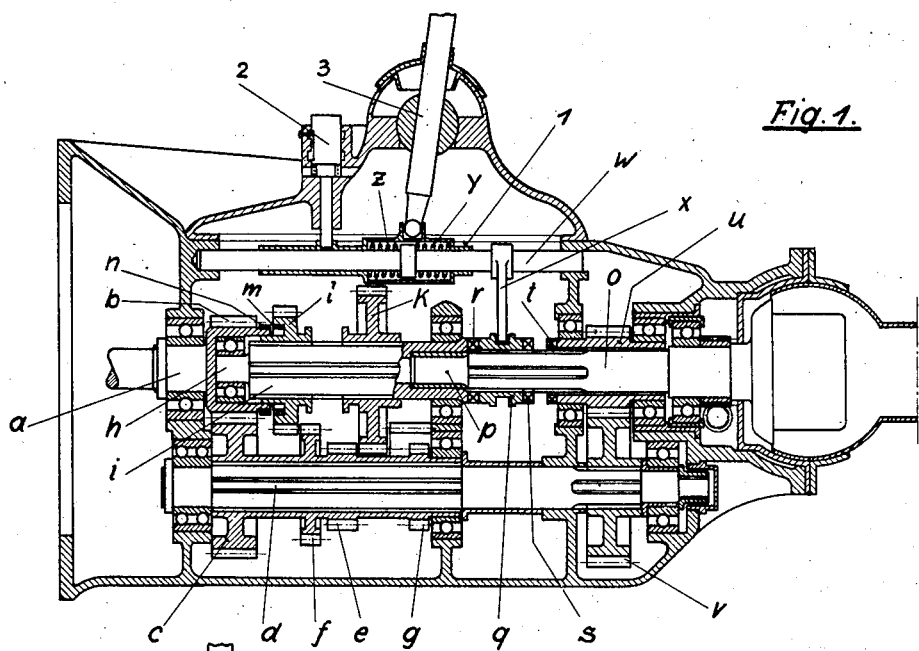
Fig. 1.
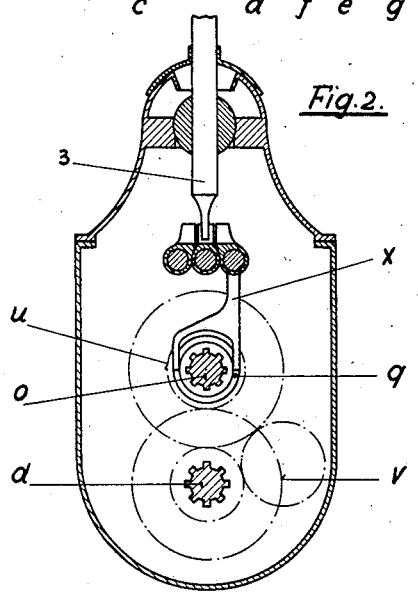
Fig. 2.
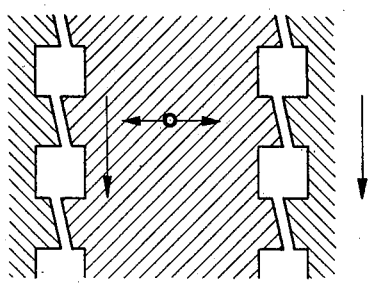
Fig. 8.
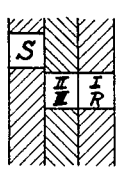 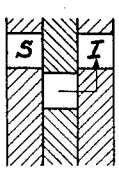 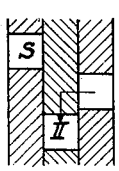 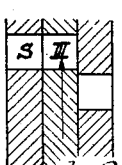 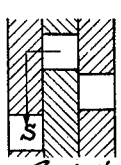
Fig. 3.  Fig. 4.  Fig. 5.  Fig. 6.  Fig. 7.
Inventor
Max Wagner
by Emerson Booth, Varney Townsend Att'ys.